United States Patent [19]
Van Dusen et al.

[11] Patent Number: 5,595,710
[45] Date of Patent: Jan. 21, 1997

[54] MEDICAL SLIDE HOLDER

[75] Inventors: John M. Van Dusen, Jupiter; Ross J. Petrie, Ft. Lauderdale, both of Fla.

[73] Assignee: Intelligent Medical Imaging, Inc., Riviera Beach, Fla.

[21] Appl. No.: 450,189

[22] Filed: May 25, 1995

[51] Int. Cl.⁶ .................................................. B65D 85/48
[52] U.S. Cl. ........................... 422/104; 422/58; 422/68.1; 422/99; 422/102; 211/41; 206/455; 206/456; 356/244
[58] Field of Search ............................... 422/58, 68.1, 99, 422/102, 104; 211/41; 206/455, 456; 356/244

[56] References Cited

U.S. PATENT DOCUMENTS

| | | | |
|---|---|---|---|
| 3,756,393 | 9/1973 | Markwitz et al. | 206/456 |
| 4,236,635 | 12/1980 | Namiki | 206/456 |
| 4,828,111 | 5/1989 | Rosenberg | 206/456 |
| 5,219,390 | 6/1993 | McClane | 206/456 |
| 5,343,768 | 9/1994 | McClane | 206/456 |

*Primary Examiner*—Jill Warden
*Assistant Examiner*—Sharidan Carrillo
*Attorney, Agent, or Firm*—John L. Sigalos

[57] ABSTRACT

A medical slide holder for use in medical procedures including automated microscopy. The slide holder comprises a rectangular frame adapted for receiving slides of differing thicknesses. Compensation for differing thicknesses is achieved through the disposition of two fastening caps, one for each end of the slides, the caps having resilient extending fingers which contact upper surfaces of the slides near their ends. Precision positioning of the slides within the holder is facilitated through provision of slide-supporting ledges having partitions to define positions of the slides; and precision positioning of the holder frame is facilitated through the provision of angled corners and notches each having a right angle and an obtuse angle. The slide holder has a recessed indentation in both the upper and lower locking caps to facilitate their removal once engaged to the frame, thus allowing slide specimens to be removed from the slide carrier for archiving purposes. Upon their removal, tangs internal to the frame's locking receptables are intentionally damaged thus preventing the frame from being re-used and preventing contamination of future slide specimens due to slide carrier re-use.

17 Claims, 2 Drawing Sheets

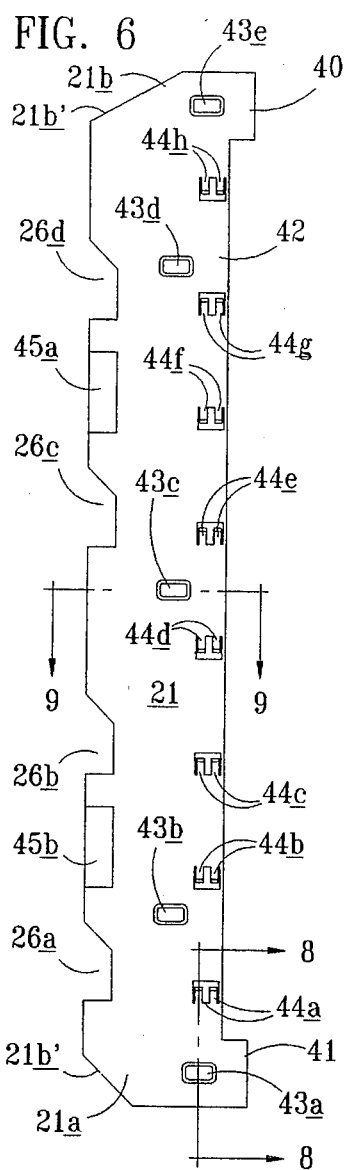
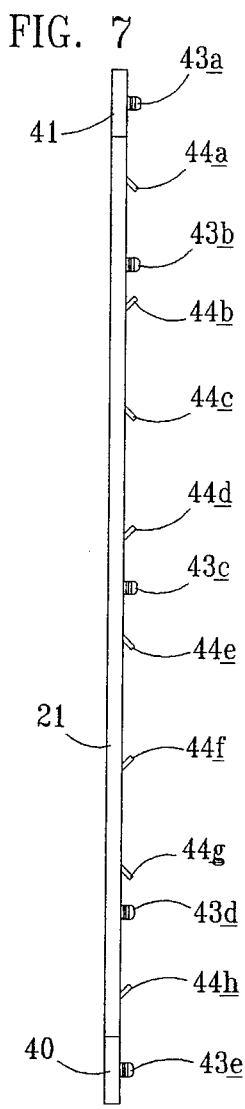
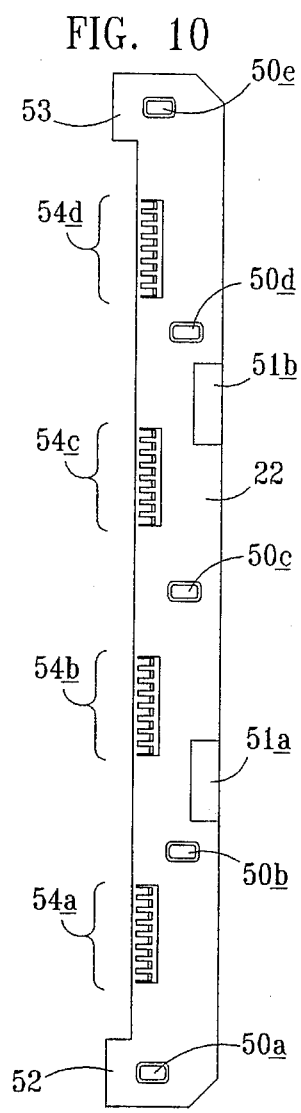
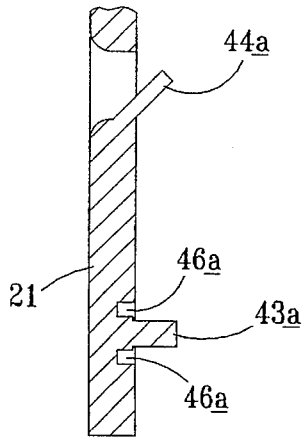
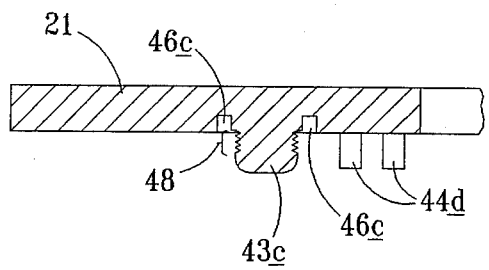

MEDICAL SLIDE HOLDER

This invention relates to slide holders that are adapted for use with automated microscopy.

BACKGROUND OF THE INVENTION

As is known to those skilled in the art, there is a high level of concern in medical circles for improving cost effectiveness while achieving and maintaining reliability and accuracy in performing diagnostics. Included within such concern are laboratory procedures such as those involving scanning and interpreting diagnostic samples, e.g., blood. To improve rapidity, specimen integrity, accuracy and cost effectiveness, there have been proposed automated scanning and computerized processing of microscopic specimens; examples being those represented by the Micro21 brand microscopic review system manufactured and sold by Intelligent Medical Imaging, Inc. of Palm Beach Gardens, Fla. According to such microscopic review system, medical technologists can load into the system a large number of slides each carrying a discrete specimen; and the computer performs the task of searching and scanning each specimen, counting items (e.g., blood cells) and performing relevant classifications. The results are then displayed on a conventional screen for examination and evaluation by interested medical personnel.

In conducting the foregoing automated processing, it has heretofore been the practice to load several slides in side-by-side relationship within a holder. The holder is then inserted into a scanner for scanning and processing. However, prior practice has been to secure specimen slides in place within a holder by using two strips of adhesive tape. Moreover, when the number of slides to be processed does not equal the capacity of the holder, it has been difficult to fix their position with a level of accuracy needed for the scanning equipment to quickly locate their operating centers, thus extending the length of time required for processing.

As is known to those skilled in the art, there are two sizes of slides that are generally considered to be standards and therefore are normally encountered in many hospitals, laboratories and other processing centers. These, respectively are those of 1.0 mm and 1.2 mm thickness.

When adhesive tape has been employed to hold slides within a slide holder, various problems have been encountered, among them being: (1) loss of adhesion due to oils and reagents coming into contact with the adhesive; and (2) non-repeatability of positioning of the slides parallel and perpendicular to the view plane.

BRIEF SUMMARY OF THE INVENTION

The improved slide holder according to the invention hereof preferably includes a rectangular frame having side members that are thinner than the interconnecting transverse front and rear members so as to facilitate movement of scanning equipment thereover when the slide holder is in use. The preferred slide holder frame surrounds an opening slightly smaller than a projection of a plurality (such as four) of 3.0" by 1.0" rectangular slides when such slides are positioned side-by side to form a rectangular shaped composite. At the inner periphery of the frame and projecting slightly inwardly from the front and rear members are thin ledges to support the ends of the slides when placed in the holder. These thin ledges are fitted with spacing tabs, or partitions, projecting slightly upwardly to define the positions of 3.0" by 1.0" standard slides when placed in the holder. These thin ledges are fitted with spacing tabs, or partitions, projecting slightly upwardly to define the positions of 3.0" by 1.0" standard slides when placed side-by-side within the holder. In order to fix slides into desired positions within the holder, a pair of locking caps are adapted for attachment to upper surfaces of forward and rear slide holder cross members, and in order to accommodate slides of differing thicknesses, pluralities of resilient fingers extend outwardly from the underside of the locking caps to engage upper surfaces of the slides when loaded into the holder. Since the fingers are resilient and are made moveable through a relatively substantial range, they provide accommodation for varying thicknesses of slides while continuing to impart force to the surfaces of the slides to keep them in place.

OBJECTS AND FEATURES OF THE INVENTION

It is one general object of the invention to improve medical specimen slide holders.

It is another object of the invention to insure the slide carriers are not re-usable after initial assembly to insure specimen integrity, since re-use of carriers increases the possibility of specimen contamination.

It is yet another object of the invention to compensate for slides of varying thickness.

It is another object of the invention to provide precision positioning of slides within slide holders.

It is still another object of the invention to facilitate scanning by providing a precise and repeatable scan plane for each slide secure in the slide holder.

It is yet another object of the invention to facilitate correct orientation of slide holders when inserted into scanning equipment.

Accordingly, in accordance with one feature of the invention, simple co-planar shelves are positioned to provide support and repeatable planer positioning for slides, thus simplifying mounting of the slides within the holder.

In accordance with another feature of the invention, partition barriers are positioned on the aforementioned shelves, thus facilitating precision location of slides when mounted within the holder.

In accordance with still another feature of the invention, selected portions of the slide frames are made thinner in thickness than other portions thereby to facilitate travel thereover of scanning instruments when slides are being processed.

In accordance with yet another feature of the invention, a pair of locking caps are attached to the frame to lock specimen slides in place, and extending from the locking caps are pluralities of resilient fingers positioned to engage upper surfaces of specimen slides when mounted within the frames, thereby providing compensation for differing slide thicknesses. The locking caps are designed to engage once. Upon removal for any reason the tangs or projections break out and therefore making the assembly NOT re-usable.

These and other objects and features of the invention will be apparent from the following description, by way of example of a preferred embodiment, with reference to the drawing.

BRIEF DESCRIPTION OF THE DRAWING

FIG. 6 is a bottom view of a first locking cap shown in FIG. 1;

FIG. 7 is an elevation view of the first locking cap of FIG. 6;

FIG. 8 is a section view illustrating one of the flexible fingers and locking protuberances of the first locking cap of FIGS. 6 and 7;

FIG. 9 is a section view through the locking cap of FIGS. 6 and 7;

FIG. 10 is a bottom view of the second locking cap shown in FIG. 1; and

DESCRIPTION OF A PREFERRED EMBODIMENT

Figure 1:
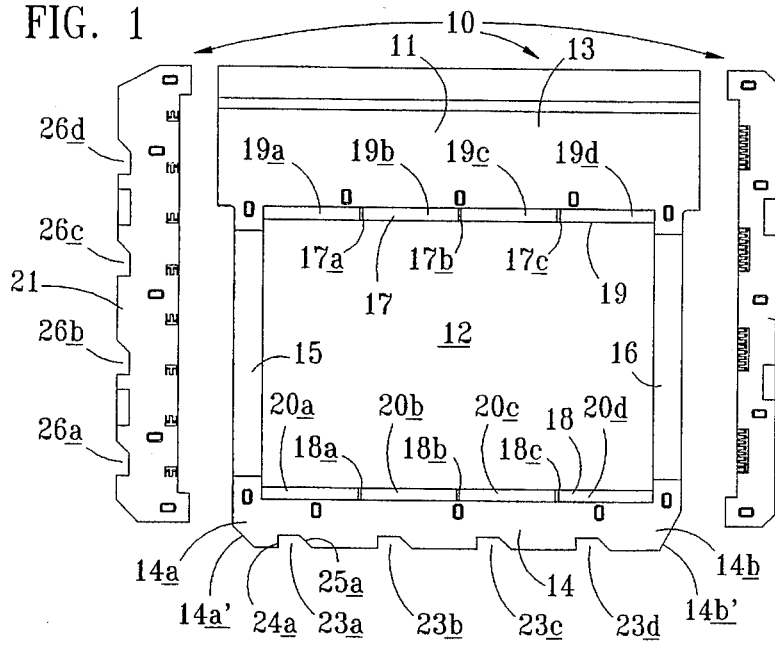
FIG. 1 is a view depicting the three principal parts of the improved medical slide holder according to the invention.

Before turning to the drawing, it may be helpful to refer to an authoritative definition of the term "rectangle" as set forth in Webster's New Collegiate Dictionary, and as used in this specification and the attendant claims. By the term "rectangle" is meant "a parallelogram all of whose angles are right angles." Such definition is seen to include squares as well as elongated shapes.

Now turning to the drawing, and more particularly FIG. 1 thereof, it will seen to illustrate an improved medical slide holder 10 according to the invention. The slide holder comprises main frame section 11 having a rectangular opening 12. Forming main frame section are horizontal rear bridging member 13, forward bridging member 14, left side member 15, and right side member 16. Projecting inwardly and recessed downwardly slightly from the planar upper surfaces of members 13 and 14 are ledges 17 and 18 each of which is fitted with upward spaced projecting partitions 17a, 17b, 17c, 18a, 18b, 18c which define regions 19a, 19b, 19c, 19d, 20a, 20b, 20c and 20d therebetween for receiving ends of conventional medical slides (not shown).

Also depicted in FIG. 1 are forward locking cap 21 and rear locking cap 22 which are elongated strips as shown. Cap 21 when locked in place is adapted to overlie forward member 14 as well as regions 20a–20d, thus overlying the aforementioned ledge 18, its partitions 18a–18c and ends of the medical slides when placed within the holder frame. Locking of cap 21 to bridging member 14 may be made by any of a variety of known techniques. However, in accordance with the preferred embodiment, such locking is accomplished through locking elements as described below.

Cap 22 when locked in place is adapted to overlie the forward part of rear member 13 as well as regions 19a–19d, thus overlying the aforementioned ledge 19, its partitions 17a–17c and ends of the medical slides when placed within the holder frame.

Further reference to FIG. 1 reveals the presence of a plurality of notches 23a–23d each of which has a side (e.g., side 24a) parallel to the axis of side members 15/16, and the other (e.g., side 25a) at an angle thereto, the latter acting to assist precise registration of the slide holder when inserted into a processor for automated processing of samples carried on the slides. Provision is also made in forward locking cap 21 for corresponding notches 26a–26d which, when locking cap 21 is locked to main frame section 11, are in precise registration with notches 23a–23d in forward bridging member 14. It should also be noted that frame member 14 is provided at its corners 14a and 14b with chamfered tapered surfaces 14a' and 14b' which provide a convenient and dependable guard against improper orientation of the frame when it is inserted into scanning equipment.

Figure 2:
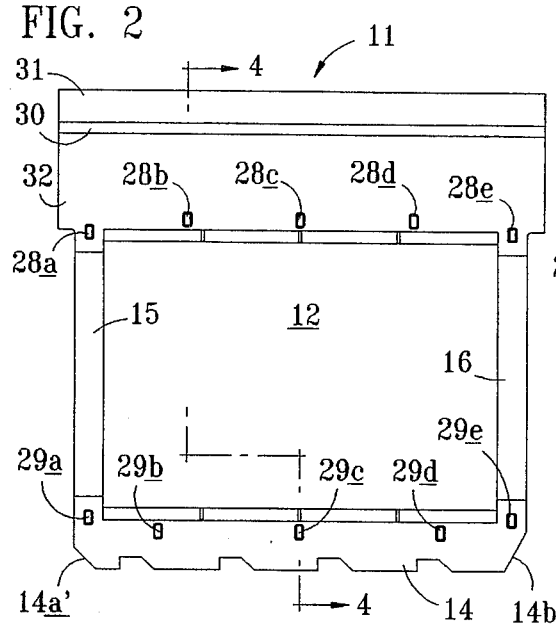
FIG. 2 is a top view of the frame portion of the holder as shown in FIG. 1.
Figure 3:
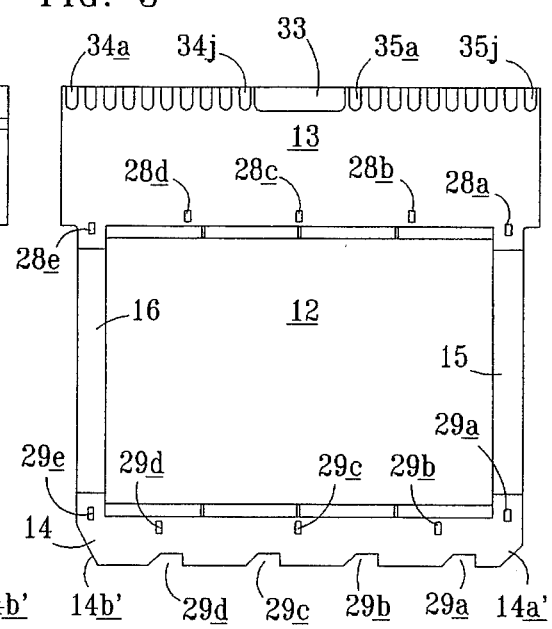
FIG. 3 is a bottom view of the frame portion of the holder of FIG. 2.

FIG. 2 is seen to depict main frame section 11 which is shown alongside FIG. 3 so as to provide a side-by-side comparison of the top and bottom of the frame, FIG. 2 depicting the top, and FIG. 3 depicting the bottom. In addition to those parts illustrated and described in connection with FIG. 1, FIG. 2 includes a section line 4—4 which defines the section depicted in FIG. 4 and which will be described below. However, before proceeding to FIGS. 3 and 4, it should be observed that there are depicted in FIG. 2 a plurality of fastening apertures 28a–28e and 29a–29e, an inclined surface 30 leading downward from elevated plane surface 31 to a lower plane surface 32. These are shown in more detail in FIG. 4.

As previously mentioned, FIG. 3 is a bottom view of the frame portion of the holder of FIGS. 1 and 2. There, it will be observed are the above-described notches 23a–23d, side members 15/16, forward/rear bridging members 13/14, and apertures 28a–28e and 29a–29e. In addition, there will be seen to be an upper central depressed region 33 and two sets of 10 each depressed regions 34a–34j and 35a–35j. These grooves are provided as a "rack" for drive pinions and drive belts within a scanner such as the MICRO21 scanner for actuating and positioning the Slide Carriers at specific input, scanning and out feed locations.

Figure 4:
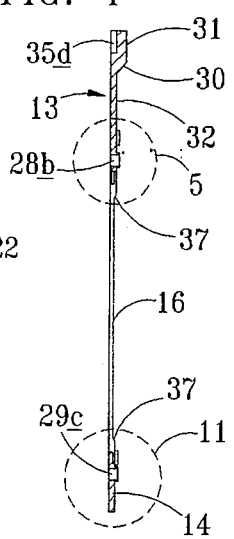
FIG. 4 is a section view through the frame taken along section lines 4—4 of FIG. 2.

Now turning to FIG. 4, it will be seen to be a section taken along section lines 4—4 of FIG. 2. There, it will be seen are depicted aforementioned items: horizontal rear bridging member 13 with elevated plane surface 31, inclined surface 30, lower plane surface 32 and aperture 28b; right side member 16; and forward bridging member 14 with aperture 29c. In addition, it should be noted that there is included a pair of small sloping surfaces 36 and 37 between bridging members 13/14 and side member 16 resulting in side member 16 being thinner than adjoining regions of members 13 and 14. By making side member 16 (and also side member 15) thinner, movement of an associated scanner thereover is facilitated when the slide holder is inserted in the scanner for processing.

The presence of dashed circle 5 will also be observed when examining FIG. 4. Dashed circle 5 indicates that in FIG. 5 there is depicted in greater detail that portion of FIG. 4 enclosed within the dashed circle. Therefore, turning to FIG. 5, it will be observed that within aperture 29b there are a pair of small, flexible inwardly extending projections 38 and 39 which form a part of the aforementioned locking mechanism that locks caps 21 and 22 to the frame. They are adapted for engagement with a plurality of mating serrations as described below in connection with FIG. 9.

Now turning to FIG. 6, it will be observed that therein is depicted a bottom view of the first, or forward, locking cap 21 as shown in FIG. 1. There are seen the aforementioned notches 26a–26d with projections 40 and 41 that extend slightly beyond principal edge 42. It should also be noted that locking cap 21 is provided at its corners 21a and 21b with chamfered tapered surfaces 21a' and 21b' which correspond to surfaces 14a' and 14b' of FIGS. 1 and 2, and which cooperate therewith to provide the aforementioned convenient and dependable guard against improper orientation of the frame when it is inserted into scanning equipment. Also depicted are a pair of rectangular recesses 45a and 45b which are provided for the purpose of inserting a tool (e.g., flathead screwdriver) and disengaging the locking cap 21 from the frame 11. In doing so, the tangs or projections 38 and 39 break out such that the frame 11 cannot be re-used, but the slide specimens can be removed.

In addition there are seen a plurality of upwardly extending and serrated male fastening members 43a–43e together with a plurality of pairs of resilient fingers 44a–44h which may be better understood from reference to FIG. 7. As mentioned previously, the resilient fingers impart retaining and positioning forces to surfaces of the medical specimen slides when the slides are positioned in the holder and the caps are fastened thereto. Although the resilient fingers may be separately formed and then attached to cap 21, it is preferable to form them with cap 21 as one integral unit, thus simplifying manufacture and minimizing cost. This latter can be seen from reference to FIG. 8 as described below.

FIG. 7 will be observed to be an elevation view of the cap 21 of FIG. 6. There, in FIG. 7 are seen the above-described projections 40, 41 extending from the main body of cap 21. In addition, there are shown extending upwardly essentially at right angles to the principal upper surface the male serrated fastening members 43a–43e and resilient fingers 44a–44h.

Reference again to FIG. 6 reveals the presence of sections 8—8 and 9—9 which are taken along the indicated dashed lines and which are illustrated respectively in FIG. 8 and FIG. 9. FIG. 8 shows the preferably integral construction of the main body 21, extending male fastening member 43a and resilient finger 44a. A recess 46a surrounds male member 43a to provide an alignment cavity into which the crown 47b surrounding aperture 28b (FIG. 5) projects when locking cap 21 is locked into place thereupon.

Figure 5:
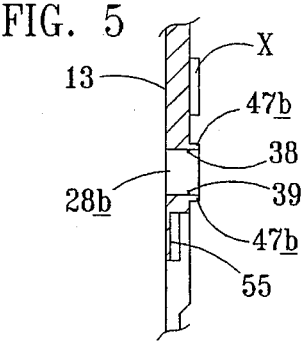
FIG. 5 is a detailed view of that portion of FIG. 4 bounded by dashed circle 5.

As mentioned above, FIG. 9 is a section taken along section lines 9—9 of FIG. 6. Thus, it shows a side section of one (43c) of the male fastening members 43 together with its surrounding recess 46c. It should be noted that there are provided a plurality of serrations 48 that are provided for ratcheting engagement with the resilient projections 38/39 within the mating female apertures, e.g., aperture 28b (FIG. 5). Also shown in FIG. 9 are a pair 44d of the above-described resilient fingers 44.

FIG. 10 illustrates the rear locking cap 22 of FIG. 1. There, it will be seen, are extending male serrated fastening members 50a–50e which are similar to the serrated male fastening members 43a–43e described above. Members 50a–50e are positioned to engage respectively with apertures 28a–28e (FIG. 2) when cap 22 is locked into position on the frame rear bridging member 13. Apertures 28a–28e include resilient inwardly extending projections similar to 38 and 39 of FIG. 5. Also shown in FIG. 10 are rectangular recesses 51a and 51b which generally correspond to rectangular recesses 45a and 45b of FIG. 6; and projections 52 and 53 which generally correspond to projections 40 and 41 of FIG. 6. Recesses 51a and 51b are to provide for the purpose of inserting a tool (e.g., flathead screwdriver) and disengaging the locking cap 22 from the frame 11. In doing so, the tangs or projections 38 and 39 break out such that the frame 11 cannot be re-used, but the slide specimens can be removed.

Figure 11:
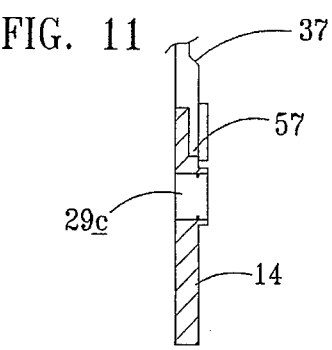
FIG. 11 is a detailed view of that portion of FIG. 4 bounded by dashed circle 11.

The resilient engaging fingers 54a–54d of locking cap 22 in FIG. 10 are unique to their counterparts in locking cap 21, resilient fingers 44a–44h, in that the resilient engaging fingers are oriented perpendicular to the edge of locking cap 22. When engaged, the resilient fingers provide a resultant force that not only secures the slide specimen to the frame 11 at surface 55 (FIG. 5) but locates the slide specimen against the frame 11 at surface 57 (FIG. 11). This provides repeatable positioning of each and every slide specimen within the slide carrier.

Although the inventions hereof have been described by way of a preferred embodiment, it will be evident that other adaptations and modifications may be employed without departing from the spirit and scope thereof. For example, positions could be provided for more or fewer slides, or the positioning notches could be relocated or altered depending on the indexing mechanism within the associated scanner.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A medical slide holder comprising:
   (a) a rectangular frame defining a rectangular opening therewithin; said rectangular frame including
      (i) a pair of opposite sides each having a proximal and a distal end;
      (ii) a front member bridging between distal ends of said opposite sides and rigidly interconnected therewith; and
      (iii) a rear member bridging between proximal ends of said opposite sides and rigidly interconnected therewith;
      said front member having a front ledge extending inwardly therefrom at a lower extremity of said front member; and said rear member having a rear ledge extending inwardly therefrom at a lower extremity of said rear member, said front and said rear ledges having slide-engaging surfaces for supporting specimen slides,
   (b) a first locking cap having an upper surface and a lower surface with a first plurality of resilient fingers protruding outwardly from said lower surface; means for fastening said first locking cap to said front member to project said first plurality of resilient fingers toward said front ledge thereby to resiliently engage upper surfaces of slides when said slides are positioned in said slide holder; and
   (c) a second locking cap having an upper surface and a lower surface with a second plurality of resilient fingers protruding outwardly from said lower surface; said second locking cap including means for fastening said second locking cap to said rear member to project said second plurality of resilient fingers toward said rear ledge thereby to resiliently engage upper surfaces of slides when said slides are positioned in said slide holder.

2. The medical slide holder according to claim 1 wherein, when said first locking cap and said second locking cap are locked respectively to said front and said rear members, said resilient fingers project downwardly toward said front and said rear ledges.

3. The medical slide holder according to claim 1 wherein said front and said rear ledges include at their slide-engaging surfaces a plurality of spaced protrusions defining positions for said slides.

4. The medical slide holder according to claim 3 in which said spaced protrusions are partition barriers.

5. The medical slide holder according to claim 1 wherein said first locking cap when fastened to said front member extends over said front ledge.

6. The medical slide holder according to claim 1 wherein said second locking cap when fastened to said rear member extends over said rear ledge.

7. The medical slide holder according to claim 1 wherein said first locking cap when fastened to said front member extends over said front ledge and wherein said second locking cap when fastened to said rear member extends over said rear ledge.

8. The medical slide holder according to claim 1 in which said first locking cap is an elongated strip.

9. The medical slide holder according to claim 1 in which said second locking cap is an elongated strip.

10. The medical slide holder according to claim 1 in which said first locking cap is a first elongated strip and in which said second locking cap is a second elongated strip.

11. The medical slide holder according to claim 1 wherein said sides are of non uniform-thickness.

12. The medical slide holder according to claim 11 wherein said non-uniform thickness is manifested in that regions of said sides at said proximal and distal ends are thicker than regions intermediate said proximal and distal ends.

13. The medical slide holder according to claim 1 wherein said front member includes two ends with a first corner at one of said ends and a second corner at the second of said ends, one of said corners having a position defining taper to ensure correct orientation of said slide holder when said slide holder is positioned for processing.

14. The medical slide holder according to claim 1 wherein said front member includes at its outer periphery a plurality of notches for precisely positioning said slide holder into a predetermined position.

15. The medical slide holder according to claim 14 wherein said notches are spaced longitudinally along said outer periphery of said front member.

16. The medical slide holder according to claim 15 wherein said notches are tapered.

17. The medical slide holder according to claim 1 wherein said first and said second locking caps each include recessed indentation means for separating said upper and said lower locking caps from said frame when said first and said second locking caps are locked to said frame.

* * * * *